(12) United States Patent
Clemans

(10) Patent No.: US 10,836,114 B1
(45) Date of Patent: Nov. 17, 2020

(54) METHOD FOR CONNECTING PIPING PIECES

(71) Applicant: Advanced Drainage Systems, Inc., Hilliard, OH (US)

(72) Inventor: James Clemans, Delaware, OH (US)

(73) Assignee: ADVANCED DRAINAGE SYSTEMS, INC., Hilliard, OH (US)

( * ) Notice: Subject to any disclaimer, the term of this patent is extended or adjusted under 35 U.S.C. 154(b) by 0 days.

(21) Appl. No.: 16/393,415

(22) Filed: Apr. 24, 2019

(51) Int. Cl.
| | |
|---|---|
| *B29C 65/06* | (2006.01) |
| *F16L 47/02* | (2006.01) |
| *B29K 627/06* | (2006.01) |
| *B29L 31/24* | (2006.01) |
| *B29C 65/56* | (2006.01) |
| *B29C 65/00* | (2006.01) |
| *B29D 23/00* | (2006.01) |
| *B29L 23/00* | (2006.01) |

(52) U.S. Cl.
CPC ........ *B29C 65/565* (2013.01); *B29C 65/0672* (2013.01); *B29C 66/1122* (2013.01); *B29C 66/5221* (2013.01); *B29C 66/71* (2013.01); *B29C 66/73921* (2013.01); *B29D 23/003* (2013.01); *F16L 47/02* (2013.01); *B29K 2627/06* (2013.01); *B29L 2023/22* (2013.01); *B29L 2031/24* (2013.01)

(58) Field of Classification Search
CPC ............. B29C 65/0672; B29C 66/1122; B29C 66/1142; B29C 66/116; B29C 66/1162; B29C 66/5221; B29C 66/534; B29C 66/5346; B29C 66/536; B29C 66/71; B29C 66/73921; B29D 23/003; B29K 2627/06; B29L 2023/00; B29L 2023/22; B29L 2031/24; F16L 47/02
See application file for complete search history.

(56) References Cited

U.S. PATENT DOCUMENTS

| | | | |
|---|---|---|---|
| 3,275,179 | A | 9/1966 | Lux et al. |
| 3,444,018 | A | 5/1969 | Hewitt |
| 3,468,732 | A | 9/1969 | Hewitt |

(Continued)

FOREIGN PATENT DOCUMENTS

| | | | | |
|---|---|---|---|---|
| CA | 2921124 A1 | 8/2017 | | |
| EP | 0105858 A2 * | 4/1984 | ............ | B65D 11/02 |

(Continued)

OTHER PUBLICATIONS

John Sprovieri, A New Spin on Plastics Assembly, https://www.assemblymag.com/articles/90159-a-new-spin-on-plastics-assembly; Publication Date: Jun. 1, 2012; Date Accessed: Mar. 13, 2018.

*Primary Examiner* — Michael A Tolin
(74) *Attorney, Agent, or Firm* — McAndrews, Held & Malloy, Ltd.

(57) ABSTRACT

A method for connecting piping includes securing a first piping portion to a base. A second piping portion is secured to a rotating portion. The second piping portion is then rotated. While the second piping portion is rotating, the second piping portion is inserted and driven through the first piping portion. A portion of the first piping portion disconnects from the remainder of the first piping portion. After this disconnection, a rotation of the second piping portion is stopped. A solid weld is formed between the first piping portion and the second piping portion.

19 Claims, 5 Drawing Sheets

(56) References Cited

U.S. PATENT DOCUMENTS

| | | | |
|---|---|---|---|
| 3,633,599 A * | 1/1972 | Roos | B29C 66/52241 137/15.13 |
| 4,457,795 A | 7/1984 | Mason et al. | |
| 5,064,485 A | 11/1991 | Smith et al. | |
| 6,004,412 A * | 12/1999 | Grigory | B29C 65/069 156/73.5 |
| 6,153,035 A | 11/2000 | Van Laeken | |
| 2014/0140779 A1 | 5/2014 | Becker | |
| 2016/0176103 A1 | 6/2016 | Rousseau et al. | |
| 2016/0228979 A1 | 8/2016 | Bray et al. | |

FOREIGN PATENT DOCUMENTS

| | | | | |
|---|---|---|---|---|
| JP | 2002011792 A * | 1/2002 | | B29C 66/322 |
| WO | 93/12344 A1 | 6/1993 | | |

* cited by examiner

METHOD FOR CONNECTING PIPING PIECES

CROSS REFERENCE TO RELATED APPLICATIONS

[Not Applicable]

BACKGROUND

It is desired that catch basins and inlet drains be watertight due to the application. The structures are catching storm water from surface and the directing it into pipe systems. During this process, water energy is being directed into the structure. It is useful to form a watertight system to ensure that water flow is not protruding out and around the structure.

A catch basin may be an inlet to the storm drain system that may include a grate or curb inlet through which storm water enters the catch basin. It may also include a sump to capture sediment, debris, and other pollutants. Catch basins may be available in multiple configurations and/or sizes, may offer connection point solutions, may provide the ability to change elevation, and may provide other options for pipe-type transitions. Endcaps may cap the otherwise open end of a pipe.

A hub may be used to make a pipe-to-pipe connection from a catch basin or inline drain for use in the installation of non-pressurized drainage and storm water piping systems. Multiple hubs may be used on a catch basin with different pipe type configurations.

Inline drains may be used at the beginning of drain line. An inline drain may be used for the installation of non-pressurized drainage and storm water piping systems. Hubs may connect different type pipes to the inline drain.

SUMMARY

According to certain inventive techniques, a method for connecting piping includes: securing a first piping portion to a base, such that rotational movement of the first piping portion with respect to the base is prevented, wherein the first piping portion includes a front side and a rear side; securing a second piping portion to a rotating portion; and rotating the rotating portion, thereby rotating the second piping portion. While the second piping portion is rotating, the second piping portion is inserted into the front side of the first piping portion. While the second piping portion while rotating is inserted into the front side of the first piping portion, the second piping portion is driven through the first piping portion such that a portion of the first piping portion disconnects, at least partially, from the remainder of the first piping portion. After a portion of the first piping portion disconnects from the remainder of the first piping portion, the rotation of the rotating portion is stopped, thereby stopping the rotation of the second piping portion. After stopping the rotation of the second piping portion, a solid weld may automatically be formed between the first piping portion and the second piping portion. The solid weld may extend from the front side to the rear side of the first piping portion. The first piping portion is then released from the base, and the second piping portion is released from the rotating portion.

The first piping portion and the second piping portion may each comprise (or consist of) a similar or same material, such as PVC (or polyethylene, polypropylene, ABS, or other similar materials). The first or second piping portion may comprise an endcap, while the complementary one of the first or second piping portion may comprise a hub. The endcap may subsequently be attached to another piping portion or related equipment.

The second piping portion may have: a lower region including a first outside diameter; a region above the lower region including a second outside diameter; and the second outside diameter is greater than the first outside diameter; and when the second piping portion is inserted into the front side of the first piping portion, at least a part of the lower region including the first outside diameter exits through the rear side of the first piping portion. When the second piping portion is inserted into the front side of the first piping portion, the region above the lower region including the second outside diameter may not exit through the rear side of the first piping portion.

The base may also rotate, thereby rotating the secured first piping portion. The base's rotation may be in a direction opposite in which the rotating portion rotates. The base rotation may be initiated before inserting the second piping portion into the first piping portion.

Figure 1A:
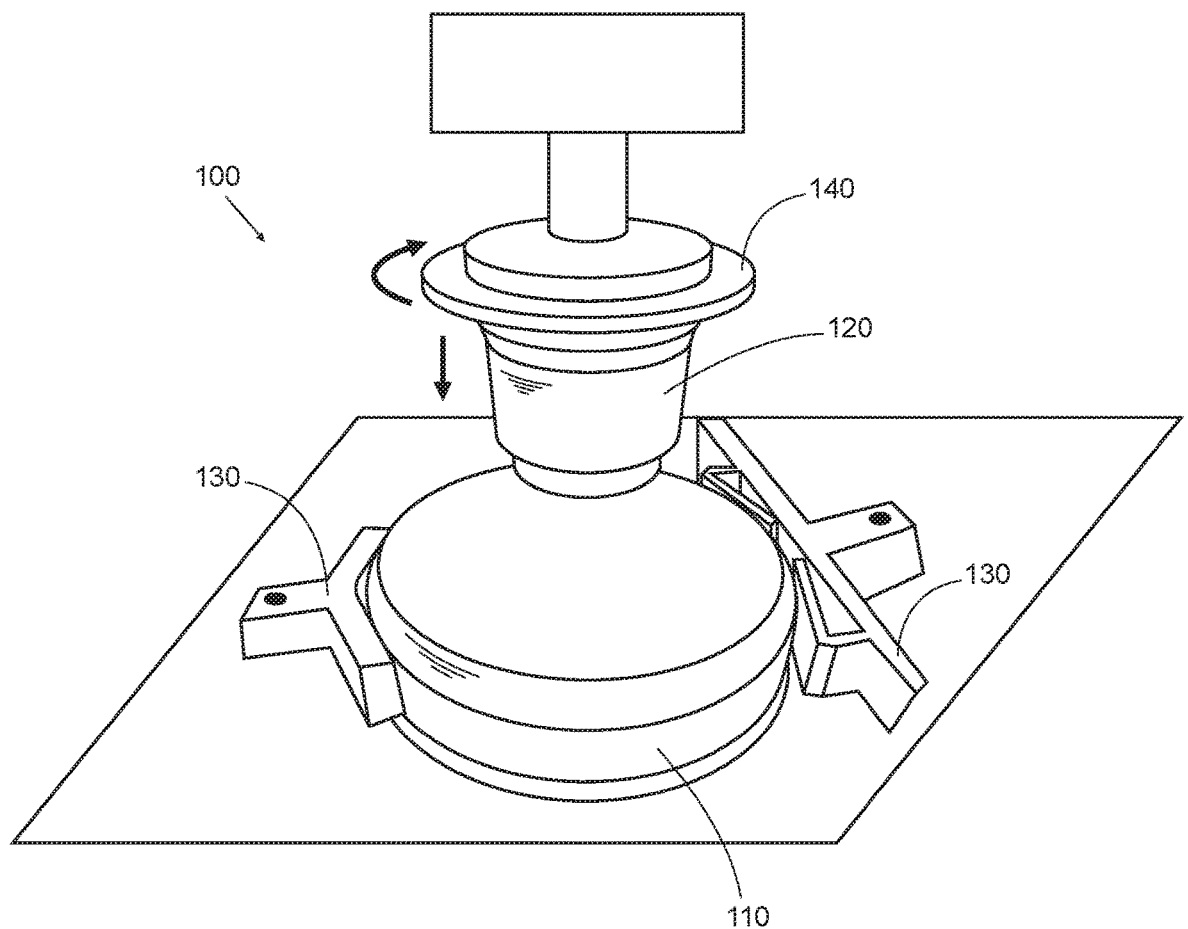
FIGS. 1A and 1B illustrate a system for joining two piping portions, according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

The techniques described henceforth allow for a weld to be formed between two piping portions. This weld prevents leakage in the joint without the need for additional glue, epoxy, gaskets, and/or other additional components or materials. Furthermore, the techniques allow for a portion of one of the piping portions to be disconnected, thereby creating an aperture through which fluids can flow from one of the piping portions to the other.

Figure 1B:
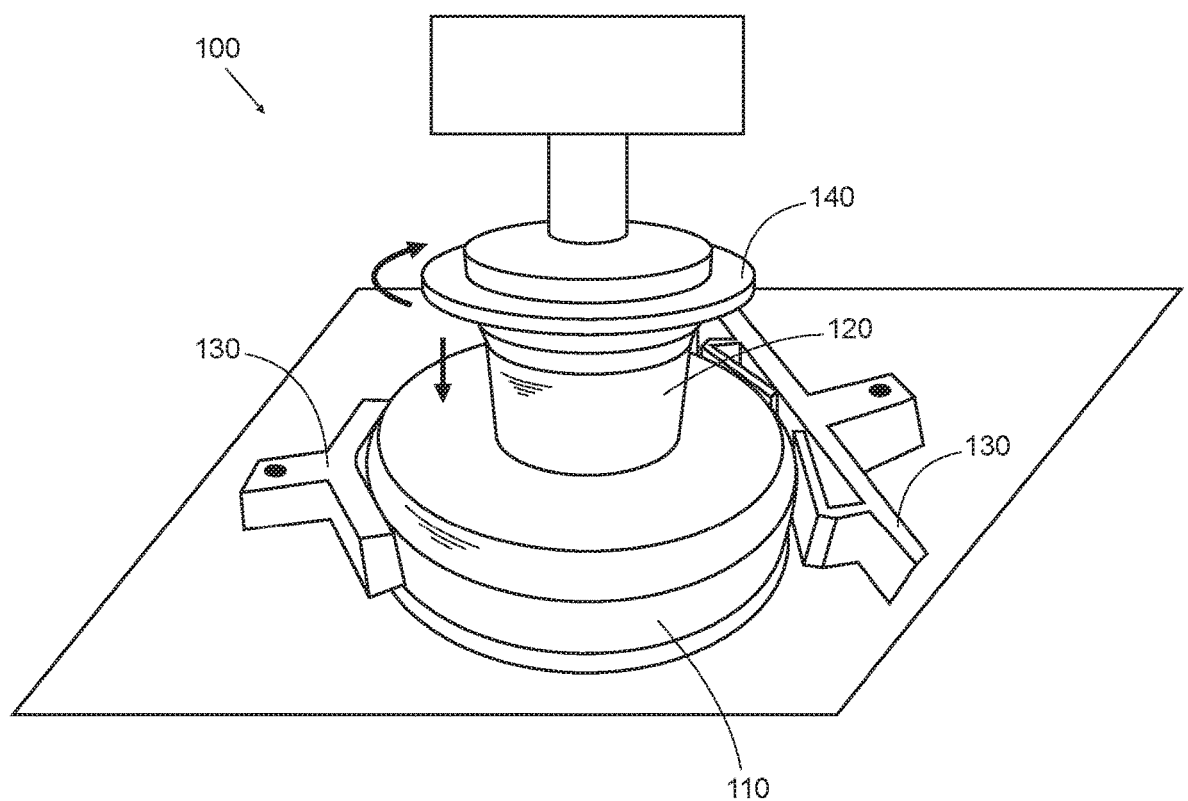
Figure 2:
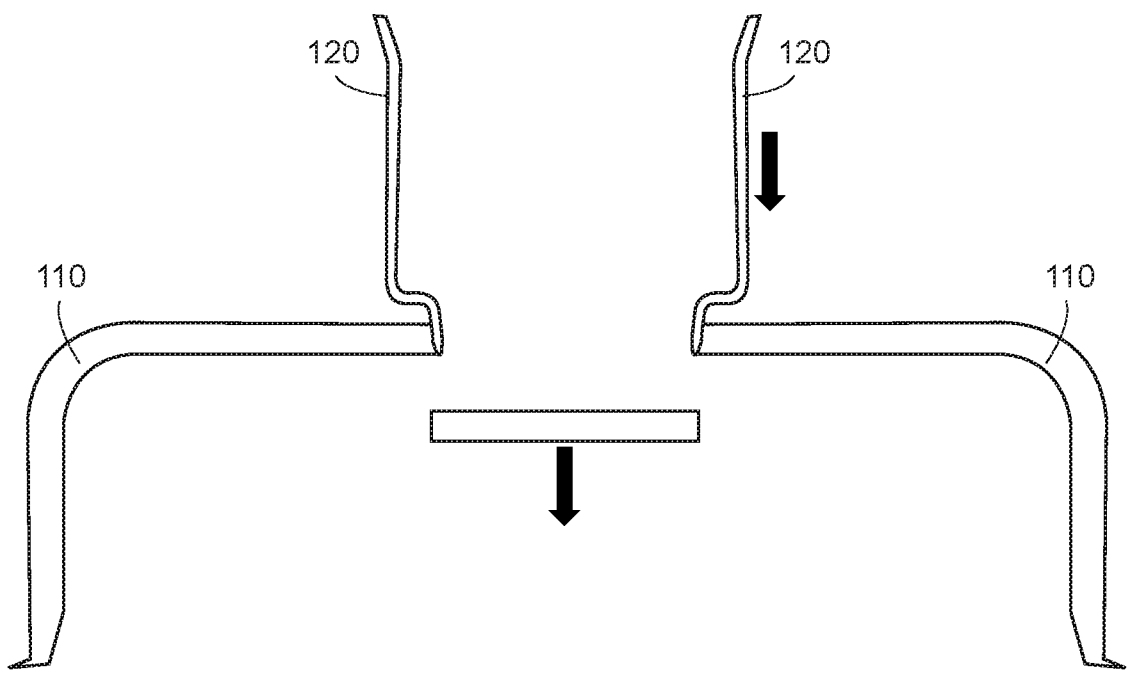
FIG. 2 illustrates a cross-sectional view of two piping portions that are being joined, according to certain inventive techniques.

FIGS. 1A and 1B illustrate a system 100 for joining two piping portions 110, 120, according to certain inventive techniques. FIG. 2 illustrates a cross-sectional view of two piping portions 110, 120 that have been joined, according to certain inventive techniques.

A first piping portion 110 (for example, an endcap, hub, or another type of piping portion, such as a bucket) may have a front-facing side (front side) and a rearward-facing side (rear side). The first piping portion 110 may be secured to a base 130 such that the front side faces outwardly. The first piping portion 110 may be secured to the base 130 by securing portions such as clamps.

The base 130 may be substantially stable, such that when the first piping portion 110 is secured to the base 130, rotational movement of the first piping portion 110 with respect to the base 130 may be prevented. By "prevented," it is understood that some trivial amount of rotational movement of the first piping portion 110 with respect to the base 130 may be possible. However, such negligible rotational movement may not negatively interfere with the act of connecting the second piping portion 120 with the first piping portion 110 as further described. The base 130 itself may not substantially rotate, or it may rotate (thereby rotating the first piping portion 110). Optionally, the base 130 may rotate in a direction that is the same as or different than the rotating portion 140 described below.

A second piping portion 120 (for example, an endcap, hub or another type of piping portion, such as plain end pipe) may be secured to a rotating portion 140. The rotating portion 140 may include a drill (e.g., mounted in a drill press) and/or a drill chuck. Other suitable rotating portions 140 may include a computer numerical control tool. For example, the rotating portion 140 may secure the second piping portion 120 from the inside of the second piping portion 120—i.e. exerting pressure on the inner surface of the second piping portion 120 to secure it to the rotating portion 140. As another option, the second piping portion 120 may be secured to the rotating portion 140 on the outer surface of the second piping portion 120. According to this technique, pressure may be exerted by the rotating portion 140 against the outer surface of the second piping portion 120—like a glove (e.g., rotating portion 140) over a hand (e.g., second piping portion 120).

Figure 3:
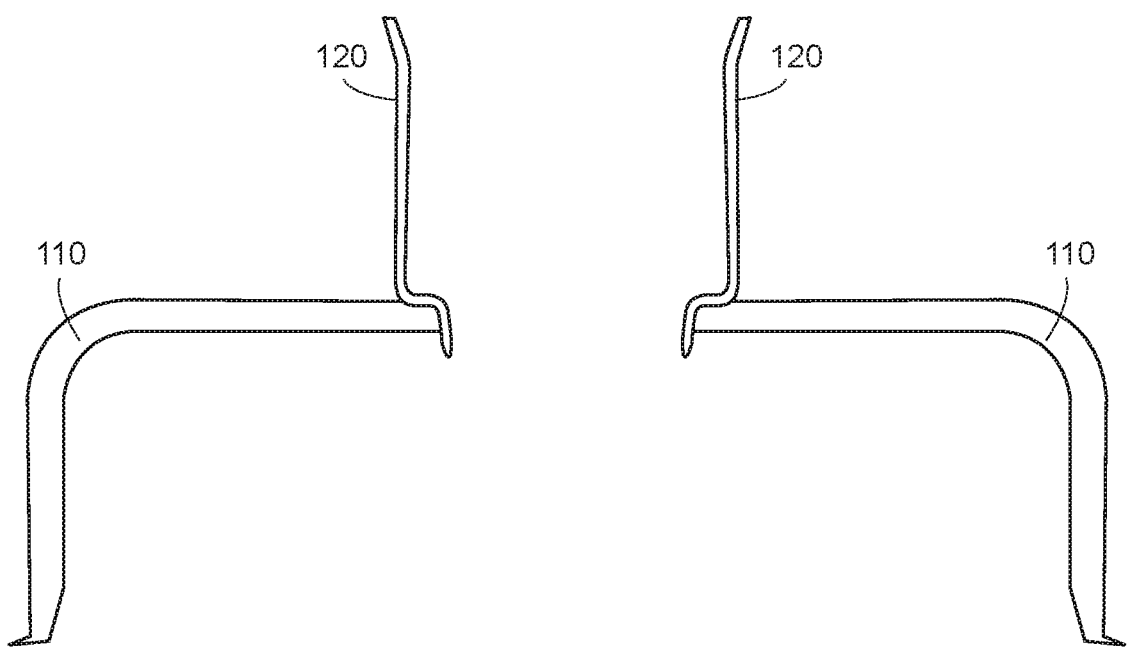
FIG. 3 illustrates a cross-sectional view of two piping portions that have been joined, according to certain inventive techniques.

The second piping portion 120 may have a rim on a lower portion as depicted in FIGS. 2 and 3. The rim may have a contour that is advantageous to disconnecting a portion of the first piping portion 110 and/or forming a weld with the first piping portion 110 as discussed below. The lower contour of the second piping portion 120 may include a beveled spigot. The lower contour of the second piping portion 120 may also have a taper from the spigot to the actual hub connection. This taper may allow for more friction between the first piping portion and the second piping portion.

The first piping portion 110 and the second piping portion 120 may each include (or consist of) a material such as polyvinyl chloride ("PVC"). Other potential materials include polyethylene, polypropylene or ABS, or other similar materials.

The first piping portion 110 and the second piping portion 120 may rotate with respect to each other (by virtue of relative rotation of the rotating portion 140 and/or the base 130) at a suitable speed, such as between 50 and 4000 revolutions per minute. According to one technique, the relative rotational speed may be 1725 revolutions per minute.

When the relative rotation of the first piping portion 110 with respect to the second piping portion 120 is of sufficient speed The second piping portion 120 may be beveled on the weld end of the fitting. This bevel may allow for the rotation of the hub to generate enough heat to cut through the endcap or pipe. Once the cut is made the taper on the hub becomes larger, causing more friction on the walls of the second piping portion 120 and the hole that was previously cut in the first piping portion 110. This friction of the two pieces generates heat and causes melting (in one or both of the first and second piping portions 110, 120), thereby fusing the two parts together. Depending on the material used, the melting temperature may be between 200-550 degrees Fahrenheit.

The weld may extend from the front side to the rear side of the first piping portion 110. As another option, the weld may be located only proximate the rear side, and not the front side of the first piping portion 110 (or vice versa). As another option, melted or softened PVC (or polyethylene, polypropylene, ABS, or other similar materials) may be pushed through an aperture (formed by the relative rotation of the second piping portion 120) by the second piping portion 120, until it exits at the rear side of the first piping portion 110. The melted/softened PVC (or polyethylene, polypropylene, ABS, or other similar materials) may then cool at, around, and/or proximate to the aperture, thereby creating a solid weld between the first piping portion 110 and the second piping portion 120. One or more of these options may take place, and they are not mutually exclusive.

Figure 4:
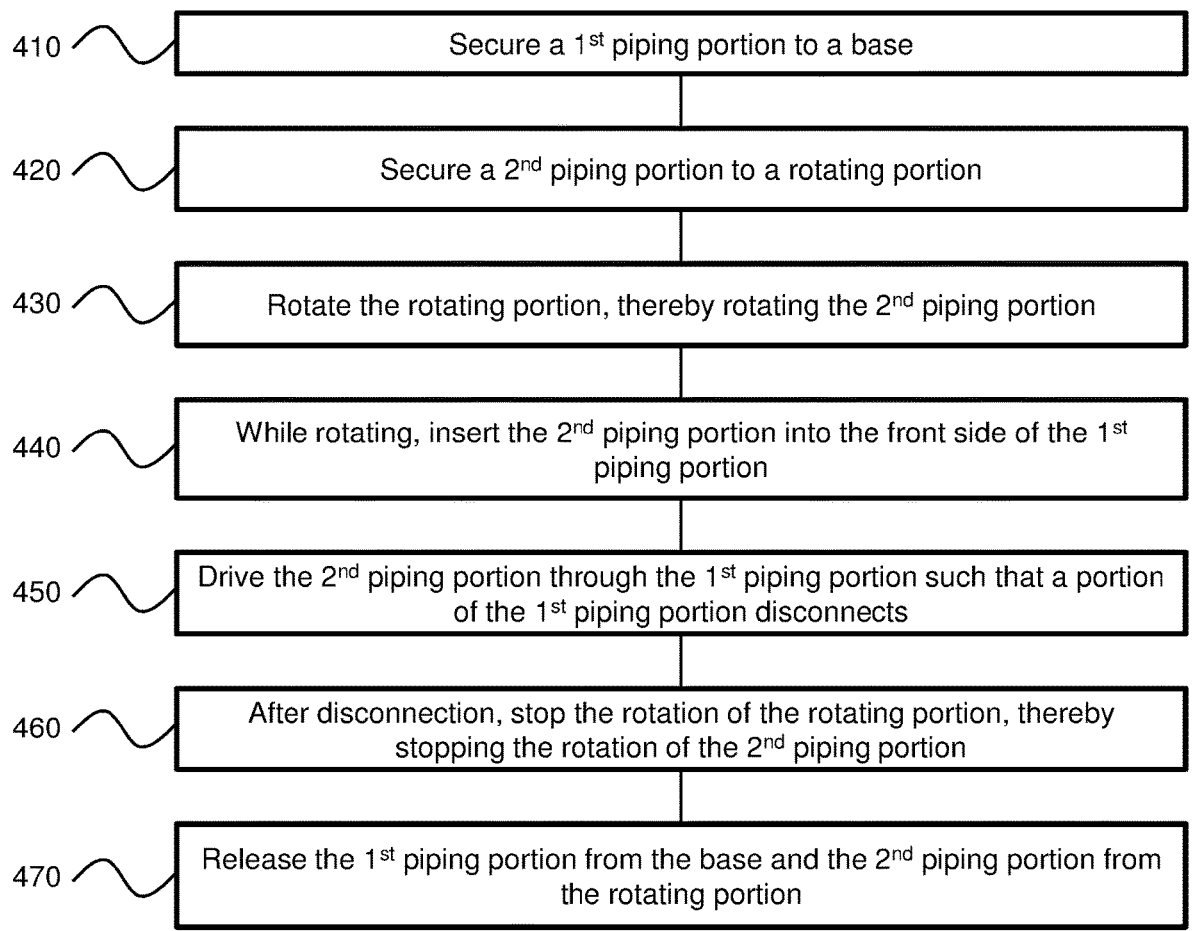
FIG. 4 shows a flowchart for a method of joining two piping portions, according to certain inventive techniques.

FIG. 4 shows a flowchart 400 for a method of joining two piping portions, according to certain inventive techniques. Certain steps of the flowchart 400 may be performed at the same time (or overlapping in time), or they may be performed in a different order. For example, steps 410 and 420 may be performed simultaneously, or step 420 may be performed before step 410. Certain steps may be omitted. Some or all of the steps may be performed by or in conjunction with a system such as system 100.

At step 410, a first piping portion 110 is secured to a base 130, for example, as shown in FIGS. 1A and 1B. At step 420, a second piping portion 120 is secured to a rotating portion 140. At step 430, the rotating portion 140 is rotated, thereby rotating the second piping portion 120. At step 440, while rotating the second piping portion 120, the second piping portion 120 is inserted into the front side of the first piping portion 110.

At step 450, the second piping portion 120 is driven into the $1^{st}$ piping portion such that a portion of the first piping portion 110 disconnects from the rest of the first piping portion 110. Such a technique is depicted, for example, in FIG. 2. The disconnected portion may completely disconnect or may only partially disconnect from the first piping portion 110. The second piping portion 120 may continue to be driven (for example, while still rotating) into the first piping portion 110 after disconnection, as shown in FIGS. 2 and 3.

At step 460, after disconnection, the rotating portion 140 is stopped from rotating, thereby stopping the rotation of the second piping portion 120. After stopping the rotation of the rotating portion 140, a solid weld may form between the first piping portion 110 and the second piping portion 120. The weld may form automatically, not requiring any further intervention.

At step 470, the first piping portion 110 is released from the base 130, and the second piping portion 120 is released from the rotating portion 140.

Once joined, the first piping portion 110 and/or second piping portion 120 may be attached to other piping or related equipment. For example, if the first piping portion 110 is an endcap, it may be attached to another pipe or piping portion after it has been joined with the second piping portion 120. As another option, the piping portions 110, 120 may be joined while the first piping portion 110 (or the second piping portion 120) is already attached to another piping portion (for example, a pipe) or related equipment.

According to one technique, the second piping portion 120 may have a lower region with a first outside diameter and a region above the lower region with a second outside diameter. As shown in FIGS. 1A, 2, and 3, the second outside diameter may be greater than the first outside diameter. Once a weld has been formed, the lower region of the second piping portion 120 may exit through the rear side of the first piping portion 110, whereas the region above the lower region of the second piping portion 120 may not exit through the rear side of the first piping portion 110 (as shown, for example, in FIG. 3).

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for connecting piping, comprising:
   securing a first piping portion to a base, such that rotational movement of the first piping portion with respect to the base is prevented, wherein the first piping portion includes a front side and a rear side, wherein the first piping portion comprises an endcap;
   securing a second piping portion to a rotating member;
   rotating the rotating member, thereby rotating the second piping portion;
   while the second piping portion is rotating, inserting the second piping portion into the front side of the first piping portion;
   while the second piping portion while rotating is inserted into the front side of the first piping portion, driving the second piping portion through the first piping portion such that a portion of the first piping portion disconnects, at least partially, from a remainder of the first piping portion;
   after the portion of the first piping portion disconnects from the remainder of the first piping portion, stopping the rotation of the rotating member, thereby stopping the rotation of the second piping portion;
   releasing the first piping portion from the base; and
   releasing the second piping portion from the rotating member.

2. The method of claim 1, wherein the first piping portion and the second piping portion each comprise a material.

3. The method of claim 2, wherein the material is polyvinyl chloride ("PVC").

4. The method of claim 1, wherein the first piping portion and the second piping portion each consist of a material.

5. The method of claim 4, wherein the material is polyvinyl chloride ("PVC").

6. The method of claim 1, wherein the second piping portion comprises a hub.

7. The method of claim 1, wherein after said stopping the rotation of the second piping portion, a solid weld is automatically formed between the first piping portion and the second piping portion.

8. The method of claim 7, wherein the solid weld extends from the front side to the rear side of the first piping portion.

9. The method of claim 1, wherein:
   the second piping portion comprises:
   a lower region including a first outside diameter;
   a region above the lower region including a second outside diameter; and
   the second outside diameter is greater than the first outside diameter; and
   when the second piping portion is inserted into the front side of the first piping portion, at least a part of the lower region including the first outside diameter exits through the rear side of the first piping portion.

10. The method of claim 9, wherein when the second piping portion is inserted into the front side of the first piping portion, the region above the lower region including the second outside diameter does not exit through the rear side of the first piping portion.

11. The method of claim 1, further comprising rotating the base, thereby rotating the first piping portion.

12. The method of claim 11, wherein said rotating the base comprises rotating the base in a direction opposite from a direction in which the rotating member rotates.

13. The method of claim 11, wherein said rotating the base is initiated before said inserting the second piping portion into the first piping portion.

14. A method for connecting piping, comprising:
   securing a first piping portion to a base, such that rotational movement of the first piping portion with respect to the base is prevented, wherein the first piping portion comprises a hub;
   securing a second piping portion to a rotating member, wherein the second piping portion includes a front side and a rear side, wherein the second piping portion comprises an endcap;
   rotating the rotating member, thereby rotating the second piping portion;
   while the second piping portion is rotating, inserting the first piping portion into the front side of the second piping portion;
   while the second piping portion while rotating is receiving the first piping portion being inserted, driving the second piping portion onto the first piping portion such that a portion of the first piping portion disconnects, at least partially, from a remainder of the first piping portion;
   after the portion of the first piping portion disconnects from the remainder of the first piping portion, stopping the rotation of the rotating member, thereby stopping the rotation of the second piping portion;
   releasing the first piping portion from the base; and
   releasing the second piping portion from the rotating member.

15. The method of claim 14, wherein the first piping portion and the second piping portion each comprise polyvinyl chloride ("PVC").

16. The method of claim 14, wherein after said stopping the rotation of the second piping portion, a solid weld is automatically formed between the first piping portion and the second piping portion.

17. A method for connecting piping, comprising:
   securing a first piping portion to a base, such that rotational movement of the first piping portion with respect to the base is prevented, wherein the first piping portion includes a front side and a rear side;
   securing a second piping portion to a rotating member;
   rotating the rotating member, thereby rotating the second piping portion;
   rotating the base, thereby rotating the first piping portion;
   while the second piping portion is rotating, inserting the second piping portion into the front side of the first piping portion;
   while the second piping portion while rotating is inserted into the front side of the first piping portion, driving the second piping portion through the first piping portion such that a portion of the first piping portion disconnects, at least partially, from a remainder of the first piping portion;

after the portion of the first piping portion disconnects from the remainder of the first piping portion, stopping the rotation of the rotating member, thereby stopping the rotation of the second piping portion;

releasing the first piping portion from the base; and releasing the second piping portion from the rotating member.

18. The method of claim 17, wherein said rotating the base comprises rotating the base in a direction opposite from a direction in which the rotating member rotates.

19. The method of claim 17, wherein said rotating the base is initiated before said inserting the second piping portion into the first piping portion.

\* \* \* \* \*